United States Patent
Yoaz et al.

(10) Patent No.: US 7,062,638 B2
(45) Date of Patent: Jun. 13, 2006

(54) PREDICTION OF ISSUED SILENT STORE OPERATIONS FOR ALLOWING SUBSEQUENTLY ISSUED LOADS TO BYPASS UNEXECUTED SILENT STORES AND CONFIRMING THE BYPASS UPON EXECUTION OF THE STORES

(75) Inventors: Adi Yoaz, Austin, TX (US); Ronny Ronen, Haifa (IL); Rajesh Patel, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 688 days.

(21) Appl. No.: 09/752,796

(22) Filed: Dec. 29, 2000

(65) Prior Publication Data

US 2002/0124156 A1    Sep. 5, 2002

(51) Int. Cl.
*G06F 9/312* (2006.01)

(52) U.S. Cl. ..................................... 712/225; 712/216

(58) Field of Classification Search ............... 712/216, 712/225
See application file for complete search history.

(56) References Cited

U.S. PATENT DOCUMENTS

| | | | | |
|---|---|---|---|---|
| 5,467,473 A | * | 11/1995 | Kahle et al. | ................... 712/23 |
| 5,931,957 A | * | 8/1999 | Konigsburg et al. | .......... 714/48 |
| 5,987,595 A | * | 11/1999 | Yoaz et al. | ................. 712/216 |
| 6,058,472 A | * | 5/2000 | Panwar et al. | ............... 712/218 |

OTHER PUBLICATIONS

Silent stores for free; Lepak, K.M.; Lipasti, M.H.; Microarchitecture, 2000. MICRO-33. Proceedings. 33rd Annual IEEE/ACM International Symposium on , Dec. 10-13, 2000; pp.: 22-31.*
On the value locality of store instructions; Lepak, K.M.; Lipasti, M.H.; Computer Architecture, 2000. Proceedings of the 27th International Symposium on , Jun. 10-14, 2000; pp.: 182-191.*
Characterization of silent stores; Bell, G.B.; Lepak, K.M.; Lipasti, M.H.; Parallel Architectures and Compilation Techniques, 2000. Proceedings. International Conference on , Oct. 15-19, 2000; pp.: 133-144.*
Lepak, K.M. and Lipasti, M.H.; On the Value Locality of Store Instructions; Jun. 10, 2000; Computer Architecture, 2000; pp. 182-191.*
Bell, G.B., Lepak, K.M., and Lipasti, M.H.; Characterization of Silent Stores; Oct. 15, 2000; Parallel Architectures and Compilation Techniques, 2000; pp. 133-144.*
Lepak, K.M. and Lipasti, M.H.; Silent Stores for Free; Dec. 10, 2000; Microarchitetcure 2000; pp. 22-31.*

* cited by examiner

*Primary Examiner*—Eric Coleman
(74) *Attorney, Agent, or Firm*—Blakely, Sokoloff, Taylor & Zafman LLP

(57) ABSTRACT

An electronic device including a predictor that has a collision history table (CHT) is presented. An extended load buffer is connected to the predictor. Also included is a marking unit, a comparing unit and a recovery unit connected to the extended load buffer. Unexecuted load instructions are advanced over store instructions. Also presented is a method for fetching an instruction and determining if an instruction is a store or a load. If the instruction is a store, then the method performs a silent store prediction. If the instruction is a load, a predicted silent store instruction is bypassed and the load instruction is executed.

26 Claims, 8 Drawing Sheets

FIG. 5 TAGLESS CHT
FIG. 4 IMPLICIT-PRED CHT
400
FIG. 3 FULL CHT
310

| PREDICTOR | DISTANCE |
|---|---|
| | |
| | |
| | |
| | |
| | |
| | |
| | |
| | |

810

TAGLESS CHT

FIG. 8

| LIP TAG | DISTANCE |
|---|---|
| | |
| | |
| | |
| | |

710

IMPLICIT-PRED CHT

| LIP TAG | PREDICTOR | DISTANCE |
|---|---|---|
| | | |
| | | |
| | | |
| | | |
| | | |

610

FULL CHT

FIG. 6

PATH UPDATE. NEW_PATH = (OLD_PATH<<2) XOR TAKEN_BRANCH_IP

PREDICTOR INDEXING: INDEX = STORE_IP XOR PATH

PREDICTION OF ISSUED SILENT STORE OPERATIONS FOR ALLOWING SUBSEQUENTLY ISSUED LOADS TO BYPASS UNEXECUTED SILENT STORES AND CONFIRMING THE BYPASS UPON EXECUTION OF THE STORES

BACKGROUND OF THE INVENTION

1. Field of the Invention

This invention relates to improving processor performance, and more particularly to a method and apparatus for predicting silent stores and bypassing prior issued store instructions with unexecuted load instructions.

2. Background Information

Out-of-order processors need to obey data dependancies. Register dependancies are easily identified by register names. Memory dependancies, however, are difficult to identify since the addresses of load and store instructions are only known at the time of execution. A load instruction typically transfers data from memory to a general register, a floating-point register, or a pair of floating-point registers. Store instructions typically transfer data from a general or floating-point register to memory. Processors, such as the P6 family, assume that load instructions depend on all previous store instructions issued, but not yet executed. Therefore, no load instructions can be advanced ahead of a previous issued store address operation. This restricts the scheduler by introducing false dependencies which, results in loss of performance.

Memory disambiguation is the ability to resolve whether a load address and a store address refer to the same address, i.e. the addresses would collide, or whether the addresses are different. This prediction would allow the advancing of load instructions before a store instruction if it is predicted not to collide.

Some of the previous approaches include the following. A scheme to never advance load instructions before a previous issued store instruction. Also, there are various types of hardware memory, software assisted memory, and architecture assisted memory disambiguation schemes. Also, several approaches to memory disambiguation have been introduced to try to predict when an address of a load instruction and an address of a previously issued store instruction will differ.

BRIEF DESCRIPTION OF THE DRAWINGS

FIG. 3 illustrates a full collision history table (CHT).

FIG. 4 illustrates an implicit-predictor CHT.

FIG. 5 illustrates a tagless CHT.

FIG. 6 illustrates a full CHT having distance bits.

FIG. 7 illustrates an implicit-predictor CHT having distance bits.

FIG. 8 illustrates a tagless CHT having distance bits.

DETAILED DESCRIPTION

The invention generally relates to a method and apparatus for improving processor performance by predicting silent stores and bypassing the silent stores with unexecuted issued load instructions. Referring to the figures, exemplary embodiments of the invention will now be described. The exemplary embodiments are provided to illustrate the invention and should not be construed as limiting the scope of the invention.

Figure 1:
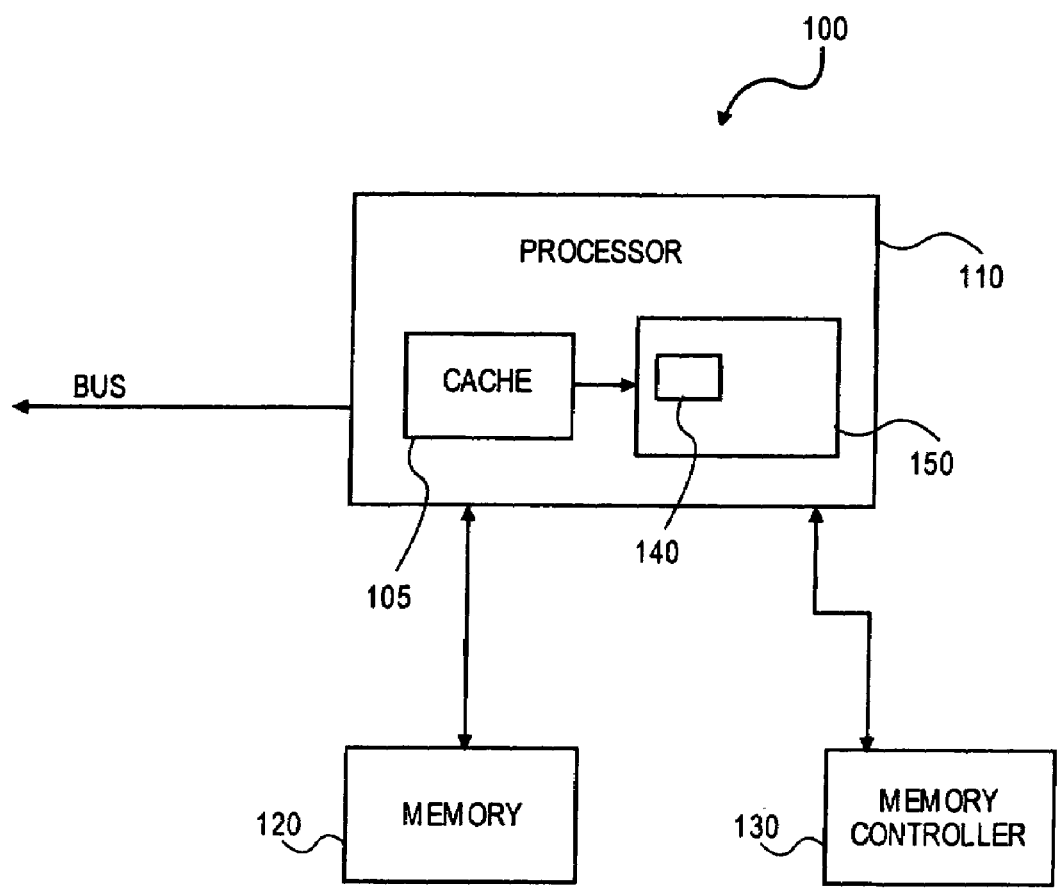
FIG. 1 illustrates a system having an embodiment of the invention within a processor.
Figure 2:
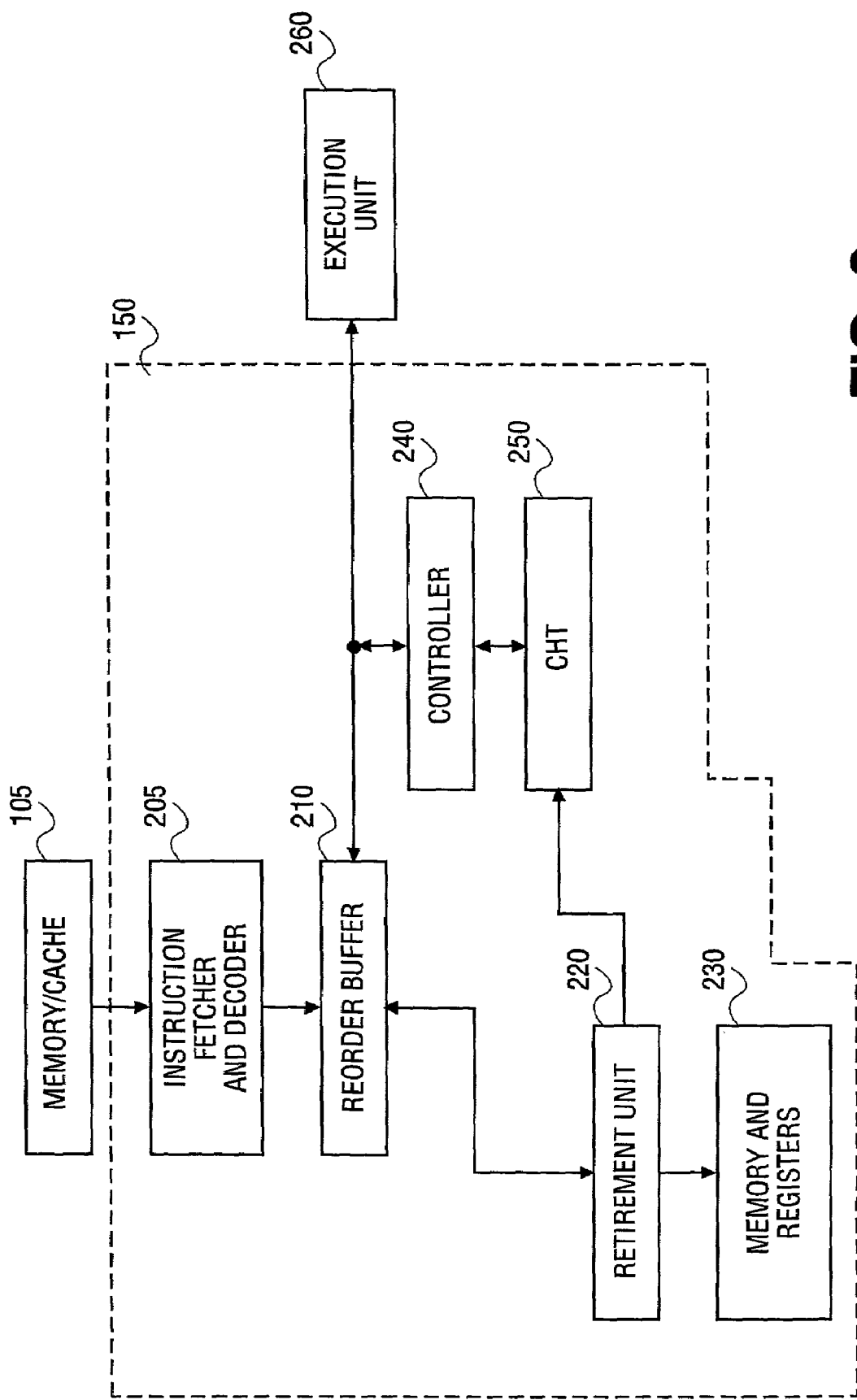
FIG. 2 illustrates an embodiment of the invention having a silent store predictor.

A silent store is a store instruction that does not change the value already present at the target address. In other words, the value being written by the store instruction matches the exact value already stored at that same memory location. FIG. 1 illustrates system 100 having processor 110 including cache 105 and processing section 150 including predictor 140, a marking function, a comparing function, and a recovery mechanism. Also included in system 100 is memory 120, memory controller 130 and a bus. FIG. 2 illustrates an embodiment of the invention having processing section 150 including instruction fetcher and decoder 205, reorder buffer 210, retirement unit 220, memory and registers 230, controller 240, collision history table (CHT) 250 and execution unit 260.

According to one embodiment, predictor 140 uses CHT 250 to bypass a silent store. In this embodiment, CHT 250 is a memory storage device having a lookup table for making predictions about load/store instructions from an instruction sequence. A load that is bypassed is marked as such. The load is checked for disambiguation and it is determined whether the stored data is equivalent to the data in a load instruction, i.e. a silent store. If the data is equivalent, then the load can bypass the silent store.

In another embodiment, CHT 250 is used to predict whether a store instruction is silent. The store instruction is predicted as being silent when the store instruction, at some earlier time, was found to be silent. One should note that using CHT 250 to predict whether a store instruction is silent is only one way of predicting silent store instructions.

CHT 250 may have a variety of organizations and may use a variety of lookup and refreshment methods that are well known in the art of cache memories. FIGS. 3–7 illustrate examples of CHTs. For example, CHT 250 can have entries that are indexed by a tag. The tag is searched when looking up a store instruction in CHT 250. FIG. 3 illustrates one embodiment where the tag of CHT 250 is linear instruction pointer (LIP) 310 for the store instruction. FIG. 4 illustrates another embodiment with CHT 250 where the entries of full and implicit predictor CHT 400 may be organized like entries of an n-way associative cache memory. FIG. 5 illustrates an embodiment where CHT 250 is tagless and is like a direct-mapped cache memory. In tagless CHT 250, each entry is indexed by a subset of the bits of the linear instruction pointer of the entry. The position of the entry in tagless CHT 250 also ordinarily contains information such as the instruction's position on a page of the memory, i.e. information from the remaining bits of the linear instruction pointer.

Different CHT's are capable of representing predictions for store instructions in different ways. In implicit-predictor type of CHT 250 illustrated in FIG. 4, all entries in CHT 250 implicitly correspond to store instructions predicted to be colliding. In full and tagless CHT's, illustrated in FIGS. 3 and 5, respectively, each entry has a respective predictor. The predictor bit is a bit that may be in a first or a second state. If the predictor bit is in the first state, the corresponding store instruction is predicted to be silent. If the predictor bit is in the second state, the corresponding instruction is predicted to not be silent.

In other CHTs, entries may have additional bits corresponding to distances. FIG. 6 illustrates full CHT 250 having distance bits 610. FIG. 7 illustrates implicit-predictor CHT 250 having distance bits 710. FIG. 8 illustrates tagless CHT 250 having distance bits 810. The distance bits predict the distance, i.e. the number of instructions, that the execution of the store instruction associated with the entry can be advanced without the execution occurring before an earlier store instruction having the same data address. The distance may also be counted as the number of all instructions, such as the number of all store instructions. Generally, embodiments of CHT 250 only make predictions about store instructions that are simultaneously in a reorder buffer (see below).

The predictor and distance bits may take any of a variety of forms, including the predictor bits being sticky bits or saturating counters. The sticky bit cannot be reset to the second state after it has been set to the first state. With a sticky bit, once an instruction is predicted, the prediction is not updated. Since each entry of a tagless CHT corresponds to several store instructions, collision probabilities of entries may change substantially in time, and the sticky bit that cannot be updated is ordinarily not the appropriate predictor for a tagless CHT. The saturating counter is similar to the sticky bit except that a subsequent update may return the counter to the second state. The distance bits predict how far a store instruction can be advanced in the execution sequence and may take a variety of forms. In some embodiments, there may be enough distance bits to distinguish all distances between instructions in reorder buffer 210. In one embodiment, the distance bits give a refined prediction for when store instructions are not silent. In another embodiment, store instructions not executed more than the distance represented by the distance bits in advance of the location of the store instruction in the instruction sequence are predicted to be not silent. In another embodiment, the distance bits are updated to predict a shortest distance that the execution of the store instruction can be advanced without leading to a collision. In another embodiment, if the last store instruction in the distance is a silent store instruction, then the silent store instruction and other prior silent store instructions can also be bypassed.

The above discussed binary predictors, i.e., branch predictors. It should be noted that with branch predictors, the number of stores that are found to be predicted as silent which, are actually found to be not silent need to be minimal due to a cost of time. The results of the branch type of predictors may not be optimum. That is, too many non-silent stores are predicted as silent (1 bit, 2 bits) or only very few silent stores are predicted as such.

Figure 9:
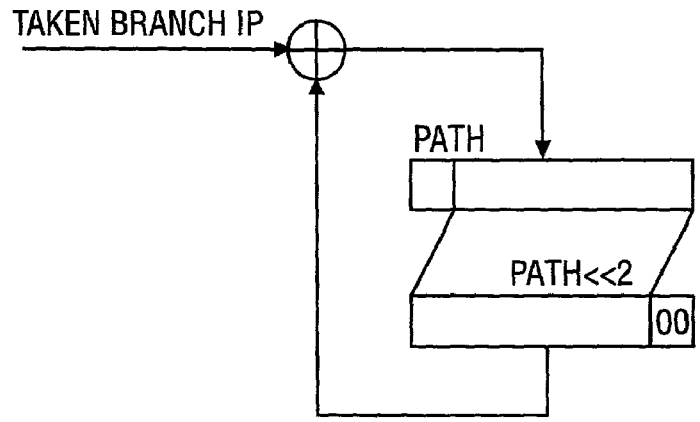
FIG. 9 illustrates a path update using an XOR.
Figure 10:
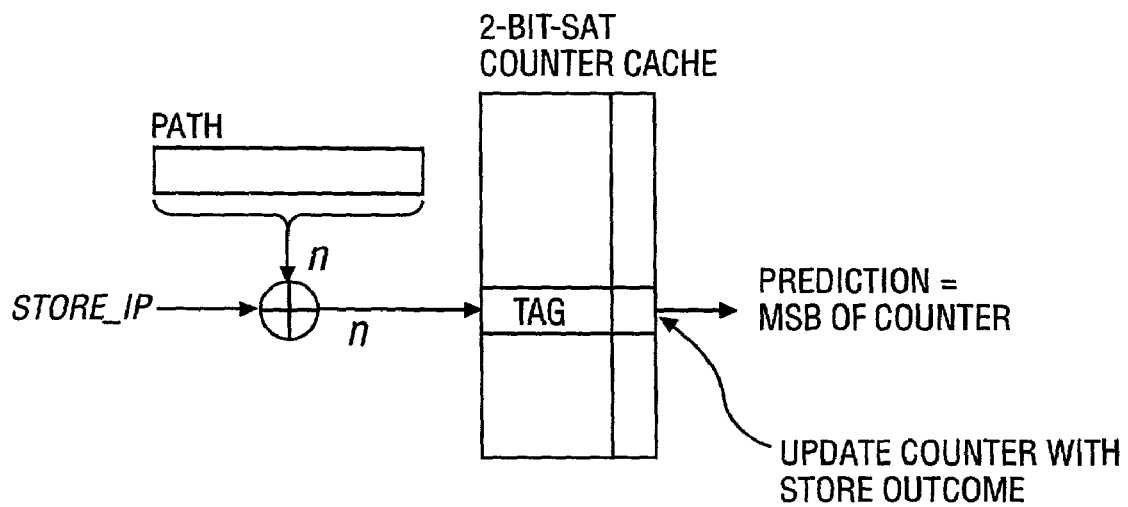
FIG. 10 illustrates a predictor indexing using an XOR.

In another embodiment, CHT 250 is used as a silent store predictor and uses path based indexing. One should note that using CHT 250 as a silent store predictor using path based indexing is only one way of predicting silent store instructions. FIG. 9 illustrates a path update mechanism. Path based indexing is accomplished by performing an XOR on the store IP with encoded control flow information. The path is based on branches, not store instructions. In one embodiment, the path is encoded as follows. The path consists of a predefined number of bits n, such as n=16 bits. On any new taken branch, the accumulated path is left-shifted by s bits, such as s=2 bits. When a store is to be predicted, an XOR is performed on the store Ip with the path to index the appropriate state machine. This path encoding allows for aging of the path as well as coverage of the state machine tables. One skilled in the art will note that other indexing techniques can also be implemented. Predictor indexing is illustrated in FIG. 10.

In one embodiment, the state machine can be such as a 1-bit, 2-bit, or sticky bit implementation. The type of state machine depends on the cost of misprediction. One-bit state machines predict more silent stores than other types of state machines, but more mistakes of predicting non-silent stores as silent are made. Two-bit and sticky bit state machines predict less silent stores than one-bit state machines and also make less mistakes, i.e. less mispredictions of silent stores. Other embodiments may include state machines that may use other parameters such as initial states of weak not-silent and strong not-silent. In a weak not-silent state, a parameter of silent or non-silent may be used. Tagged or tagless state machines may also be used in other embodiments.

The path updates are performed speculatively according to the speculated fetching of instruction. It should be noted that each branch has to be associated with its appropriate path. The path is recovered upon branch misprediction recovery. The state machines are then updated when the store commits.

Figure 11:
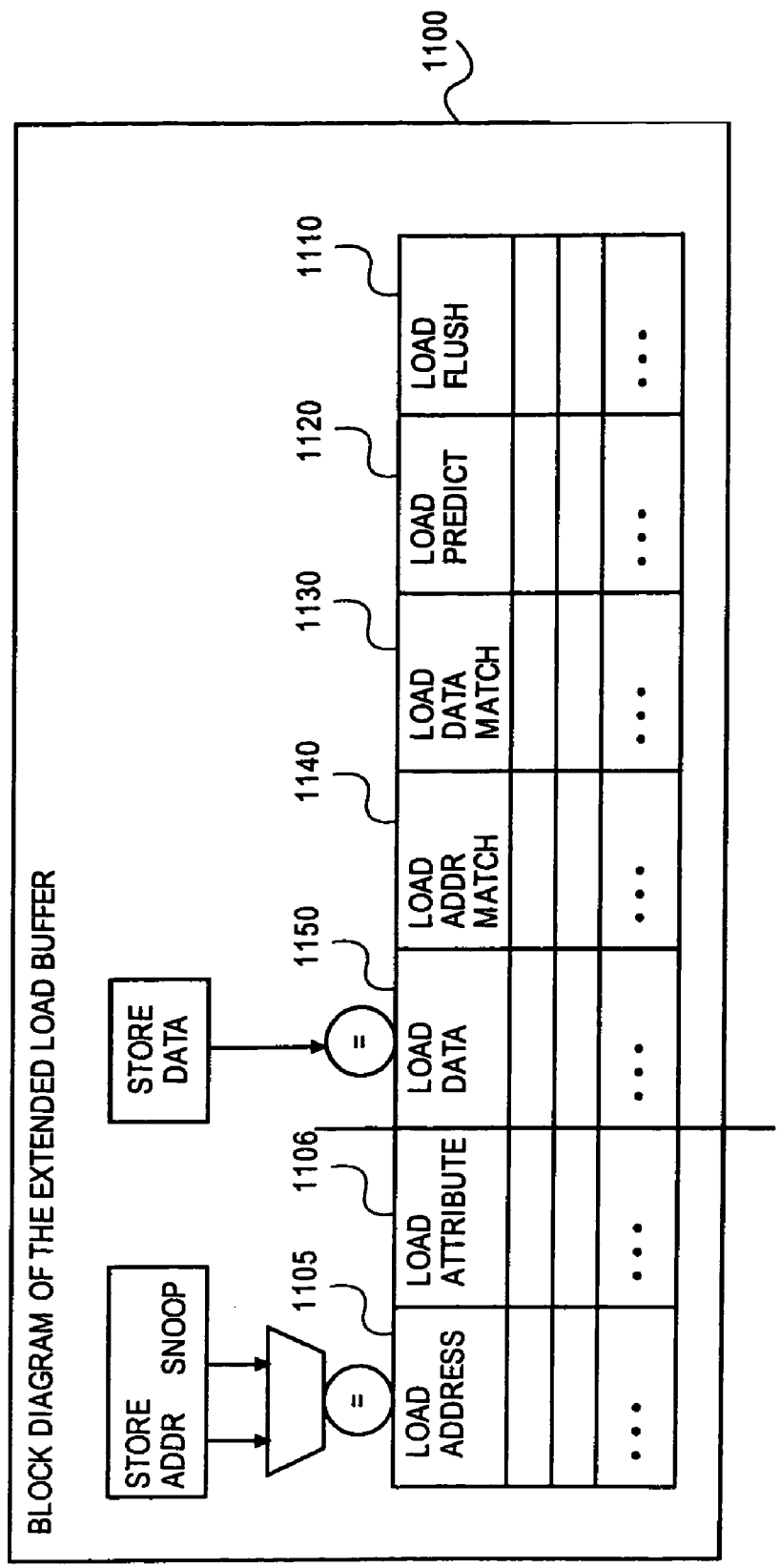
FIG. 11 illustrates an extended load buffer.

After the silent store instructions are predicted, future load instructions can bypass the issued silent store instructions. For recovery purposes, the load instructions that are to bypass the silent store instructions are marked as bypassing. In one embodiment, the marking of the bypassing load is accomplished by the setting of one bit of the load predict portion in extended load buffer 1100 that is illustrated in FIG. 11. Extended load buffer 1100 includes load data segment 1150, load address match segment 1140, load data match segment 1130, load predict segment 1120, load flush segment 1110, load address segment 1105 and load attribute segment 1106. In another embodiment, the bypassing load marking bit can also be not set in load predict segment 1120 to indicate a bypassing load. The predicted silent store needs to be marked as bypass. The marking of a silent store is accomplished by setting a bit in a store buffer (not shown). In another embodiment, the silent store marking bit can also be not set to indicate a silent store.

In another embodiment, since the store instructions will always snoop extended load buffer 1100 to ensure there are not younger load instructions that are completed and that match the store instructions memory address and data content, load instructions do not need to be marked since the marking of the load predict segment 1120 is redundant.

Upon an actual store instruction being executed, the value of the bypassing load instruction is then compared with the value of the data actually stored via the executed store instruction. If there is a mismatch, i.e., the value of the stored data and the bypassing load data are not the same, recovery begins. Thus, verification is performed by the store instruction snoops extended load buffer 1100 and the address and data are compared for the load instructions. This verifies that the load instruction has correct data.

With the recovery mechanism, if a predicted silent store instruction is found to be non-silent, then all bypassing load instructions and their associated dependent instructions have to be re-executed. In another embodiment, recovery of other instructions, such as only recovery including re-execution of advanced loads and their associated dependent instructions.

Figure 12:
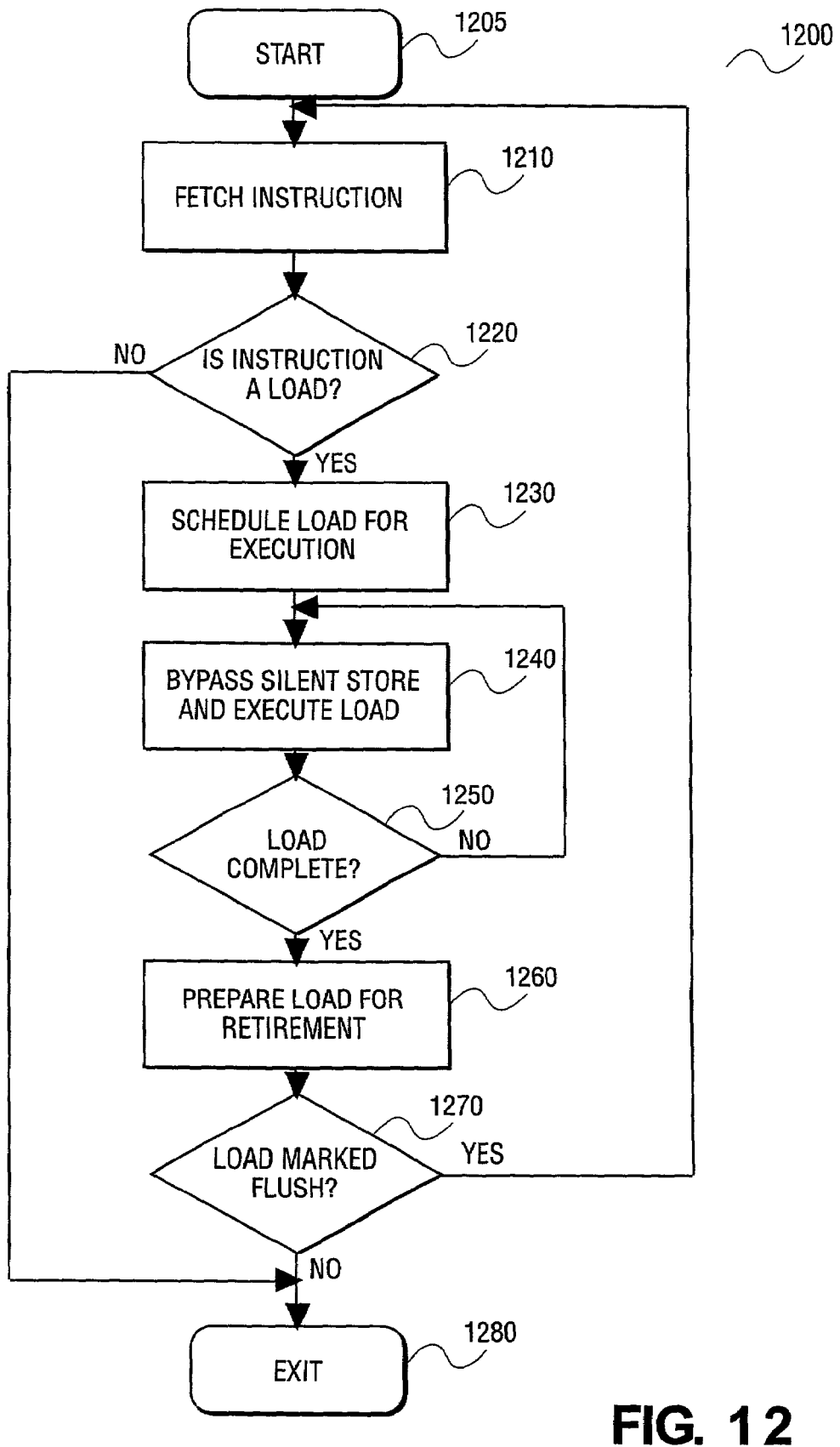
FIG. 12 illustrates a flow diagram of a load instruction sequence of an embodiment of the invention.

FIG. 12 illustrates the flow for load instructions in one embodiment. An instruction is fetched by process 1210. It is then determiend whether the fetched instruction is a load instruction or not by process 1220. If the instruction fetched is not a load instruction, process 1200 exits at 1280. If the fetched instruction is a load instruction, the load is scheduled for execution by process 1230. Silent store instructions are then bypassed and the load is executed by process 1240. It is then determined if the load instruction is completed by process 1250. If the load instruction is not complete, the load instruction is continued to be executed by process 1240. If the load instruction is complete, the load is prepared for retirement by process 1260. It is then determined if the load is marked flush by process 1270. If the load is marked flush, then process 1200 continues at start 1205 where process 1210 fetches the next instruction. If the load is not marked flush, process 1200 the proceeds to exit 1280.

Figure 13:
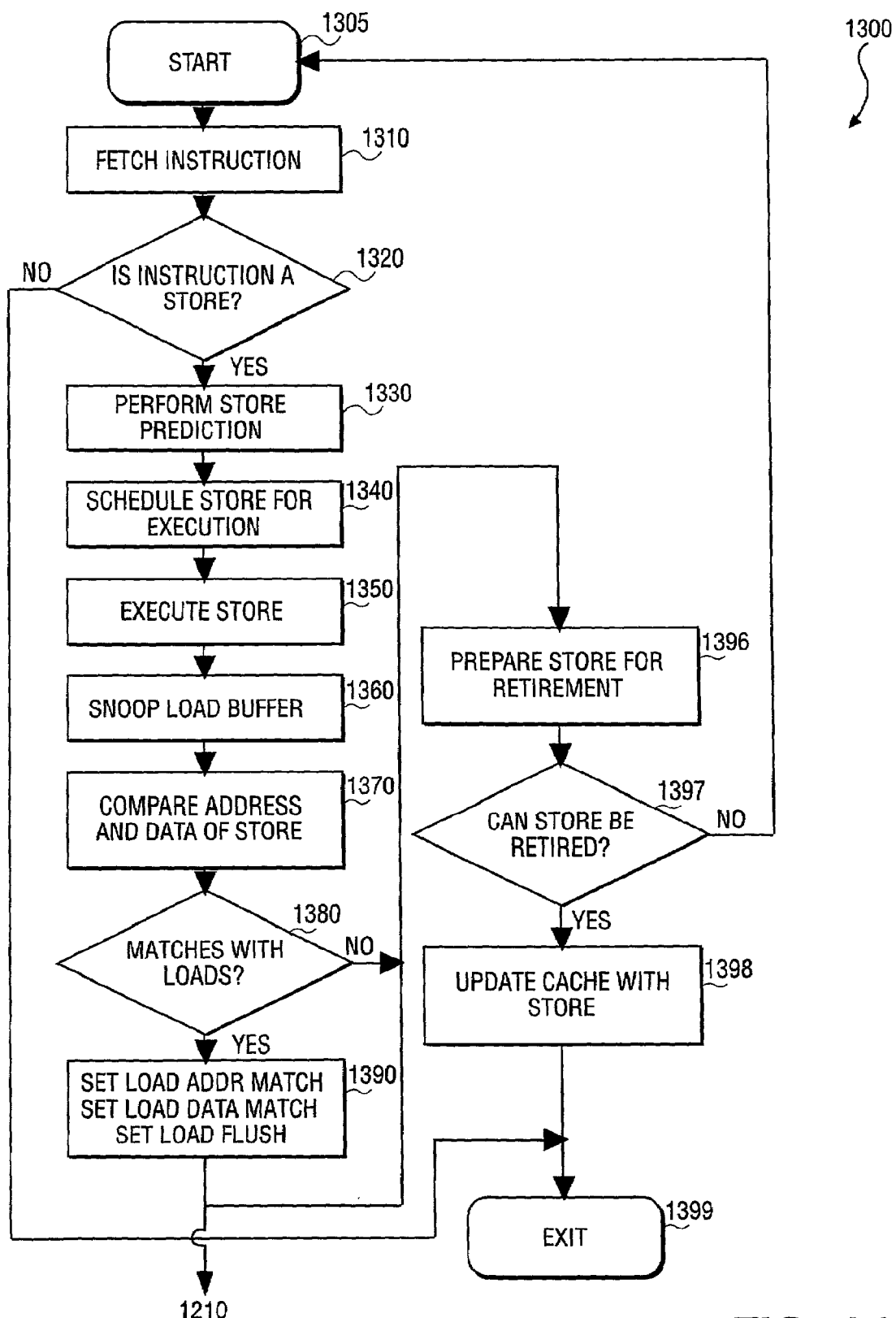
FIG. 13 illustrates a flow diagram of a store instruction sequence of an embodiment of the invention.

FIG. 13 illustrates the flow for store instructions in one embodiment. An instruction is fetched by process 1310. It is determined if the instruction is a store by process 1320. If the fetched instruction is not a store, process 1300 exits at 1399. If the fetched instruction is a store instruction, a predictor is processed for predicting silent stores by process 1330. The store instruction is then scheduled for execution by process 1340. The store instruction is then executed by process 1350. The load buffer is snooped by process 1360 next. The address and data of the store instruction are then compared with all executed load instructions in extended load buffer 1100 by process 1370. Process 1380 determines if a match occurs. If a match occurs, process 1390 sets load address match segment, load data matched segment, and load flush segment in extended buffer 1100. If a match does not occur, process 1300 proceeds with store retirement process 1396. It is determined then if the store instruction can be retired by process 1397. If the store instruction can be retired, process 1398 then updates a cache with the store instruction and then proceeds to exit 1399. If the store instruction can not be retired, process 1300 continues to start 1305.

For ease of explanation, an example will be presented describing how extended load buffer 1100 enables misprediction detection. Assuming the following instructions are issued in the order presented:

| | |
|---|---|
| St0 A [data D1] | (Store instruction to store data D1 from register 0 to address A) |
| St1 A [data D1] | (Store instruction to store data D1 from register 1 to address A) |
| Ld0 A | (Load instruction to load the data D1 from address A, to register 0) |

If instructions St0 and St1 are not executed yet, and predicted as silent, then Ld0 will bypass St0 and St1 ignoring the fact that their addresses are unknown. Ld0 receives data from the cache/memory structure and writes the data onto the write-back bus and into the load buffer. Upon St0 being executed, its address and data are compared against all previous younger loads from St0 load instructions in the load buffer. If the address and data are valid in the load buffer, and the store address and data match the load, then the load has the correct value. If the address matches, but the loaded data does not match the store data, the load and its dependent instructions must be re-executed, or be flushed out in case there is no re-execution mechanism in the embodiment. Thus, in the above example, the address and data for St0 and St1 match the value loaded by Ld0. The bypass is correct and performance is gained due to earlier execution of the load.

The content of the load buffer after the execution of Ld0, St0 and St1 would be as follows:

| | |
|---|---|
| Load address buffer: | A |
| Load Attribute buffer: | n/a |
| Load Data Buffer: | D1 |
| Address content addressable memory (CAM) match: | 1 |
| Data CAM match: | 1 |
| Load Flush: | 0 |

Also for ease of discussion, another example is presented below for which a misprediction is detected. For this example, the following instructions are listed in the issued order:

| | |
|---|---|
| St0 A [data D1] | (Store instruction to store data D1 from register 0 to address A) |
| St1 A [data D2] | (Store instruction to store data D2 from register 1 to address A) |
| Ld0 A | (Load instruction to load the data from address A, D2, to register 0) |

For this example, assume that St0 and St1 have not executed yet. Ld0 gets data D1 from the cache/memory structure and writes it onto the write-back bus and into the load buffer. Upon St0 being executed, its address and data are compared against all previous ("younger") loads in the load buffer. If the load data is valid, the address and data will match with the load and no action is taken. Upon St1 being executed, its address and data are compared. In St1's case, however, the data did not match and the load flush bit is set. Once the load is "tagged" as a load flush, it acts as a sticky bit and can not be reset. If the load data is not valid (does not match) and the address matches, then load flush is set. For OOO (out of order) machines, if St1 executes before St0, load flush will be set. Upon St0 executed, the load flush is not reset since the load flush is sticky.

The content of the load buffer after the execution of Ld0, St0 and St1 would be as follows:

| | |
|---|---|
| Load address buffer: | A |
| Load Attribute buffer: | n/a |
| Load Data Buffer: | D1 |
| Address content addressable memory (CAM) match: | 1 |
| Data CAM match: | 0 |
| Load Flush: | 1 |

For an implementation where the store instruction is broken into two microinstructions (store address and store data), such as in P1U and P6, the address and data comparisons may occur at different times, but the mechanism to set load flush remains the same.

Therefore, embodiments of the invention expands cases where a load instruction can bypass previous issued store instructions. The process of memory disambiguation is enhanced by allowing loads to bypass silent stores without being flushed. The number of flushes caused by a load bypassing an older store with the same address is reduced. Thus, improving processor performance. Also, one should note that even without predicting silent store instructions, that other features are present. Since silent stores can be marked as such post facto, embodiments can take advantage of this knowledge. One such advantage is bypassing with other load instructions. Another advantage is ignoring the writing since the data is equivalent. Thus saving amount of writes and improving performance.

The above embodiments can also be stored on a device or medium and read by a machine to perform instructions. The device or medium may include a solid state memory device and/or a rotating magnetic or optical disk. The device or medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a predictor having a collision history table (CHT), said predictor for predicting silent store instructions;
   a processing section coupled to the predictor, the processing section including
   an extended load buffer coupled to the predictor;
   a marking processing section;
   a comparing processing section; and
   a recovery processing section, wherein unexecuted load instructions are advanced over associated silent store instructions without flushing the load instructions,
   wherein the predictor compares an unexecuted load instruction value with an issued and unexecuted store instruction value, and the unexecuted load instruction bypasses the issued store instruction for execution if the unexecuted load instruction value and the issued and unexecuted store value are the same, and the unexecuted load instruction is dependent on the issued and unexecuted store instruction.

2. The apparatus of claim 1, wherein the predictor is a silent store predictor.

3. The apparatus of claim 2, wherein the silent store predictor uses path based indexing and the path is based on branches.

4. The apparatus of claim 3, wherein the silent store predictor is coupled with a state machine.

5. The apparatus of claim 4, wherein the state machine is one of a 1-bit, a 2-bit and a sticky bit.

6. The apparatus of claim 1, wherein the predictor is memory dependent.

7. The apparatus of claim 1, wherein the extended load buffer comprises bit fields to mark load address match, load data match, load predict, and load flush, and bit fields for load address, load attribute and load data.

8. The apparatus of claim 1, wherein the CHT is one of indexed by a tag and tagless.

9. The apparatus of claim 1, wherein the CHT includes distance bits.

10. A system comprising:
    a processor having internal memory,
    a bus coupled to the processor;
    a memory coupled to a memory controller and the processor;
    wherein the processor includes:
    a predictor having a collision history table (CHT), said predictor for predicting silent store instructions;
    an extended load buffer coupled to the predictor;
    a marking process;
    a comparing process; and
    a recovery process,
    wherein unexecuted load instructions are advanced over associated store instructions without flushing the load instructions, and the predictor compares an unexecuted load instruction value with an issued and unexecuted store instruction value, and the unexecuted load instruction bypasses the issued store instruction for execution if the unexecuted load instruction value and the issued and unexecuted store value are the same, and the unexecuted load instruction is dependent on the issued and unexecuted store instruction.

11. The system of claim 10, wherein the predictor is a silent store predictor.

12. The system of claim 11, wherein the silent store predictor uses path based indexing and the path is based on branches.

13. The system of claim 12, wherein the silent store predictor is coupled with a state machine.

14. The system of claim 13, wherein the state machine is one of a 1-bit, a 2-bit and a sticky bit.

15. The system of claim 10, wherein the predictor is memory dependent.

16. The system of claim 10, wherein the extended load buffer comprises
    bit fields to mark load address match, load data match, load predict, and load flush, and bit fields for load address, load attribute and load data.

17. The system of claim 10, wherein the CHT is one of indexed by a tag and tagless.

18. The system of claim 10, wherein the CHT includes distance bits.

19. A method comprising:
    fetching an instruction and determining if an instruction is one of a store and a load;
    performing a silent store prediction if the instruction is a store; issuing the store instruction;
    comparing an address and data of the store instruction with load instructions in an extended load buffer;
    setting marking bits in the extended load buffer if a match is found in the comparing;
    updating a memory with the store instruction if the store instruction can be retired; and
    bypassing a predicted silent store instruction if an associated unexecuted load instruction value matches the issued and unexecuted store instruction value and executing the load instruction ahead of the predicted silent store instruction without flushing load instructions, wherein the unexecuted load instruction is dependent on the issued and unexecuted store instruction.

20. The method of claim 19, further comprising preparing the executed load instruction for retirement if the load instruction is complete, and determining if the load instruction is marked flush in the extended load buffer.

21. The method of claim 19, wherein the predicting includes marking bits in a collision history table (CHT).

22. The method of claim 19, wherein the memory is a cache.

23. A program storage device readable by a machine comprising instructions that cause the machine to:
    fetch an operation and determining if the operation is one of a store instruction and a load instruction;
    perform a silent store prediction if the operation is a store instruction;
    execute the store operation;
    compare an address and data of the store operation with load operations in an extended load buffer;
    set marking bits in the extended load buffer if a match is found in the compare instruction;

update a memory with a store operation if the store operation can be retired; and bypass a predicted silent store operation and execute an associated load operation ahead of the silent store operation without flushing load instructions if the operation is a load and the load operation includes a value that matches a value included in the store operation, wherein the load operation is unexecuted and is dependent on the silent store operation.

24. The program storage device of claim 23, wherein the instructions further cause the machine to prepare the load operation for retirement if the load operation is complete, and determining if the load operation is marked flush in the extended load buffer.

25. The program storage device of claim 23, wherein the instruction that causes the machine to predict silent stores includes an instruction that causes the machine to mark bits in a collision history table (CHT).

26. The program storage device of claim 23, wherein the memory is a cache.

* * * * *